May 3, 1932.  L. C. JONES  1,856,955
PROCESS FOR PRODUCTION OF NITROGEN HYDROGEN GAS MIXTURES FREE FROM OXYGEN
Filed Feb. 11, 1930
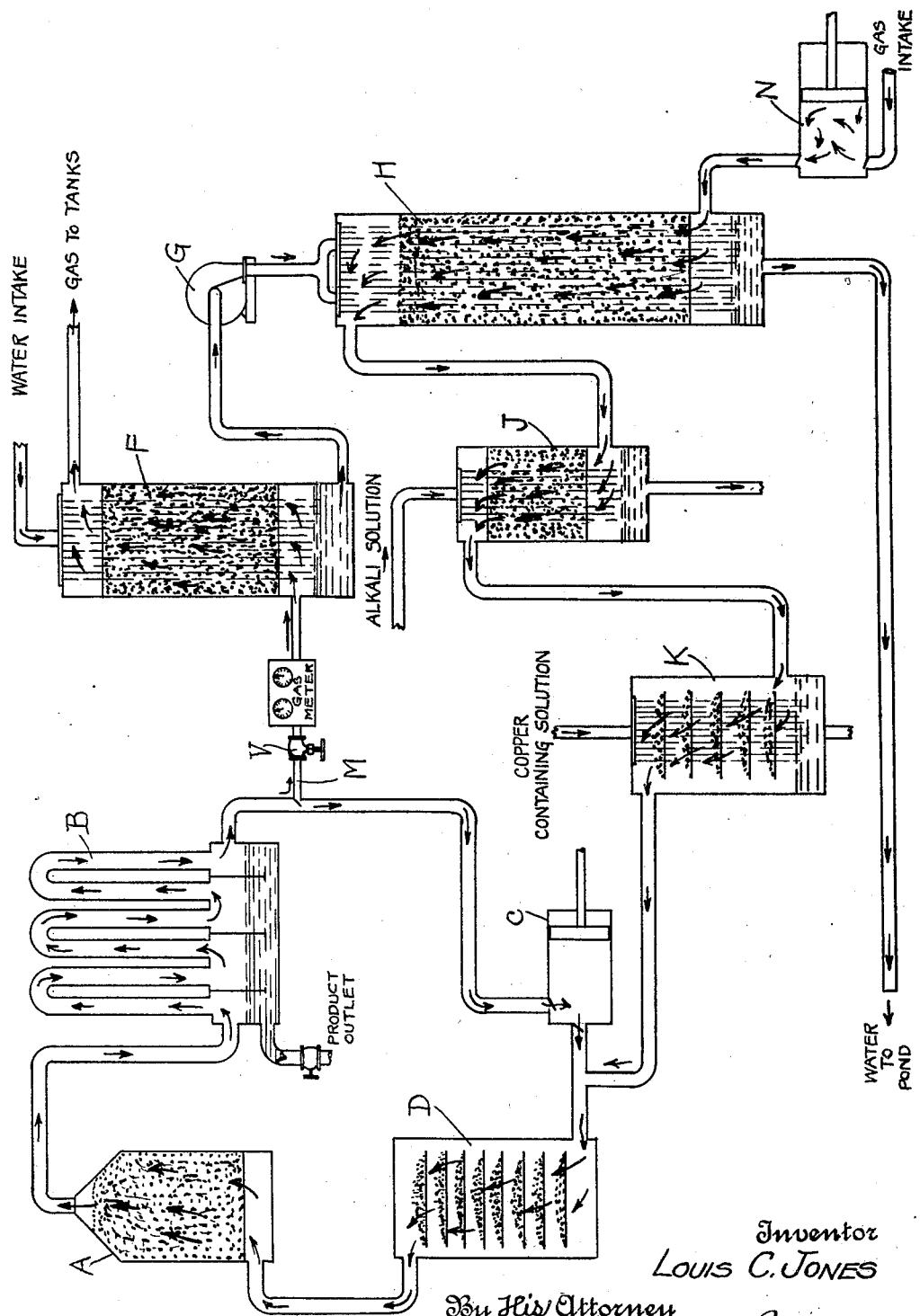
Inventor
Louis C. Jones
By His Attorney
Philip C. Peck Patented May 3, 1932

1,856,955

UNITED STATES PATENT OFFICE

LOUIS CLEVELAND JONES, OF GREENWICH, CONNECTICUT, ASSIGNOR TO CHEMICAL ENGINEERING CORPORATION, OF NEW YORK, N. Y., A CORPORATION OF DELAWARE

PROCESS FOR PRODUCTION OF NITROGEN-HYDROGEN GAS MIXTURES FREE FROM OXYGEN

Application filed February 11, 1930. Serial No. 427,458.

My invention relates to the preparation of nitrogen-hydrogen gas mixtures for the synthesis of ammonia, and more particularly to improved processes of purifying this gas mixture so as to free same of oxygen impurities which would poison or otherwise render ineffective the catalysts used in the catalytic production of ammonia.

In the purification of nitrogen-hydrogen gas mixtures made from coke or hydrocarbons by the water gas process, it has been customary to remove a large portion of carbon dioxide by washing with water under pressure, aand thereafter washing the gas mixture with caustic to remove the remaining carbon dioxide, and also with copper solutions to remove carbon monoxide.

The removal of carbon dioxide by washing with water requires large volumes of water, especially in summer months or in warm climates when the temperature of the water is high.

I have discovered that under such conditions the amount of oxygen dissolved in water ordinarily obtained from water supplies saturated with air and carried into the gas current in such washing process is sufficient in quantity to cause difficulty in subsequent operations for the ammonia synthesis. Although the nitrogen content of the water is not injurious, the oxygen under certain conditions brought into the gas current is likely to cause poisoning of the catalyst unless removed by special purification operations.

I have found it not only desirable, but also advantageous in the synthesis of ammonia from a nitrogen-hydrogen gas to eliminate this source of oxygen contamination by pretreatment of the water to be used in the washing process.

I have further discovered that the oxygen usually contained in the water supply can be removed to a sufficient extent to avoid subsequent difficulties by blowing through the water a gas free from oxygen.

For example, in the ammonia synthesis operation there accumulate in the circulating system inert gases which must be removed by bleeding from such high pressure system. I have found a new and simplified process of purifying this nitrogen-hydrogen gas by bringing the water supply on its way to the washing operation in direct contact with these inert gases bled from the high pressure synthesis system so as to deoxidize such water with these bled gases before such water is used to wash the crude gas entering the system. Although these inert gases form a convenient supply of gas for deoxidizing the water supply, I do not wish to confine myself to its use, since any other gas free from oxygen, preferably containing only hydrogen and nitrogen, can be used for this purpose.

In practice this "bleed" gas is conducted through a tower or similar contacting apparatus, preferably against the water current thus sweeping out the oxygen normally contained in the water supply.

The accompanying drawing shows in diagrammatic form and in vertical section a form of apparatus that may be used conveniently for carrying out the essential features of my invention.

Referring to the drawing, the usual equipment for all ammonia synthesis is shown in the converter A containing the catalyst with the ammonia gas passing from this converter A through the cooler and condenser B having an outlet at the bottom for removal of the ammonia product. The residual gas then passes through the circulating compressor C and thereafter through the purifier D before entering the converter A for catalysis.

In such ammonia synthesis the combined nitrogen and hydrogen gases so compressed to an elevated pressure and heated to a suitable temperature are passed through a suitable catalyst in the converter A whereby a certain proportion of the combined gases is converted into ammonia. In industrial practice it is extremely advantageous in securing satisfactory yields to remove as far as possible all traces of oxygen impurities from the nitrogen-hydrogen gas mixture before treating same catalytically.

According to my improved process of purification the inert gases are bled from this high pressure system through a pipe M having the valve V through a gas meter to the bottom of the water deoxidizer F filled with small pieces of porcelain to provide a suitable surface-giving mass over which the current of wash water from the water intake is poured to trickle downwardly against the rising current of inert gases which are passed to gas tanks from an outlet near the top of the deoxidizer F.

The water collecting in the bottom of this deoxidizer F is then passed through the high pressure water pump G to the carbon dioxide scrubbing tower H constructed like the deoxidizer F and also largely filled with substances providing a surface-giving mass. Near the bottom of the tower H is the gas intake for the impure nitrogen-hydrogen gas which is forced upwardly through the tower H by the gas compressor N.

The water passing downwardly through the tower H is collected at the bottom of the tower and then is drawn off from the apparatus to the pond. The gas is then taken from the top of the tower H to the caustic washer J operating with an alkali solution, preferably caustic soda, in the same way as the deoxidizer F and tower H, and then the gas is passed upwardly through carbon monoxide purifier K fed with a copper-containing solution, the gas passing upwardly as shown through the washer J and purifier K with suitable outlets in their respective bottoms to carry off surplus solutions which may be advantageously circulated through the washer J and purifier K if desired. The gas from the purifier K free from oxygen impurities is then passed into the high pressure circulating system for the ammonia synthesis between the gas compressor C and purifier D as shown.

This washing of the impure gas through the purification apparatus hereinbefore described removes the last traces of oxygen impurities from the nitrogen-hydrogen gas mixture and the current of substantially pure gas is introduced into the high pressure system for the ammonia synthesis before mentioned.

The foregoing illustration is only one practical method of utilizing the inert gases bled from the circulating system to serve for deoxidizing the water supply used to wash the crude gas mixture in carrying out my invention; in a similar manner any gas free from oxygen derived from any other suitable source may be utilized for deoxidizing such water supply before the gas washing. The details of my improved process for purification may be varied in many ways without departing from the scope of the invention or sacrificing the advantages derived from its use.

I claim as my invention:

1. The process for the production of nitrogen-hydrogen gas mixtures free from oxygen for ammonia synthesis, which comprises deoxidizing a water supply with a gas free from oxygen, washing the raw nitrogen-hydrogen gas mixture with said deoxidized water, and then passing the gas mixture so purified to the ammonia synthesis.

2. The process for the production of nitrogen-hydrogen gas mixtures free from oxygen for ammonia synthesis, which comprises deoxidizing a water supply with a gas free from oxygen and containing only hydrogen and nitrogen, washing the raw nitrogen-hydrogen gas mixture with said deoxidized water, and then passing the gas mixture so purified to the ammonia synthesis.

3. The process for the production of nitrogen-hydrogen gas mixtures free from oxygen for ammonia synthesis, which comprises deoxidizing a water supply with inert gases removed from the ammonia synthesis system, washing the raw nitrogen-hydrogen gas mixture with said deoxidized water, and then passing the gas mixture so purified to the ammonia synthesis.

4. The process for the production of nitrogen-hydrogen gas mixture free from oxygen for ammonia synthesis, which comprises removing inert gases from the ammonia synthesis system, deoxidizing a water supply with said inert gases, washing the raw nitrogen-hydrogen gas mixture with said deoxidized water, and then passing the gas mixture so purified to the ammonia synthesis.

5. The process for the production of nitrogen-hydrogen gas mixture free from oxygen for ammonia synthesis, which comprises removing inert gases from the ammonia synthesis system, bringing said inert gases into contact with a water supply in counter-current flow to deoxidize the water, washing the raw nitrogen-hydrogen gas mixture with said deoxidized water, and then passing the gas mixture so purified to the ammonia synthesis.

6. In the purification of nitrogen-hydrogen gas mixtures for ammonia synthesis by washing with water, the steps which consist in deoxidizing said water by bringing inert gases into contact with the water in counter-current flow, and then washing said gas mixtures with said deoxidized water before passing same to the ammonia synthesis.

7. In the purification of nitrogen-hydrogen gas mixtures for ammonia synthesis by washing with water, the steps which consist in deoxodizing said water by bringing inert gases removed from the ammonia synthesis system into contact with the water in counter-current flow, and then washing said gas mixtures with said deoxidized water before passing same to the ammonia synthesis.

LOUIS CLEVELAND JONES.